July 21, 1970   J. F. ROESEL, JR   3,521,149
ELECTRIC POWER GENERATOR
Filed Nov. 16, 1966
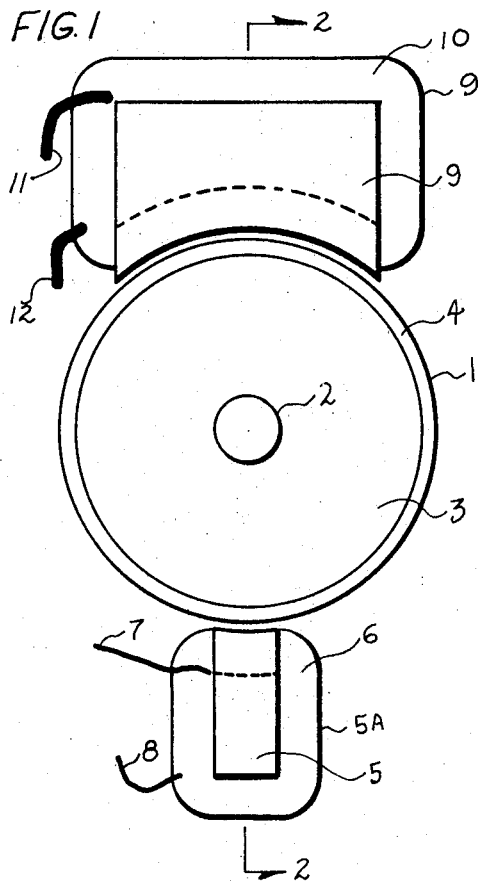
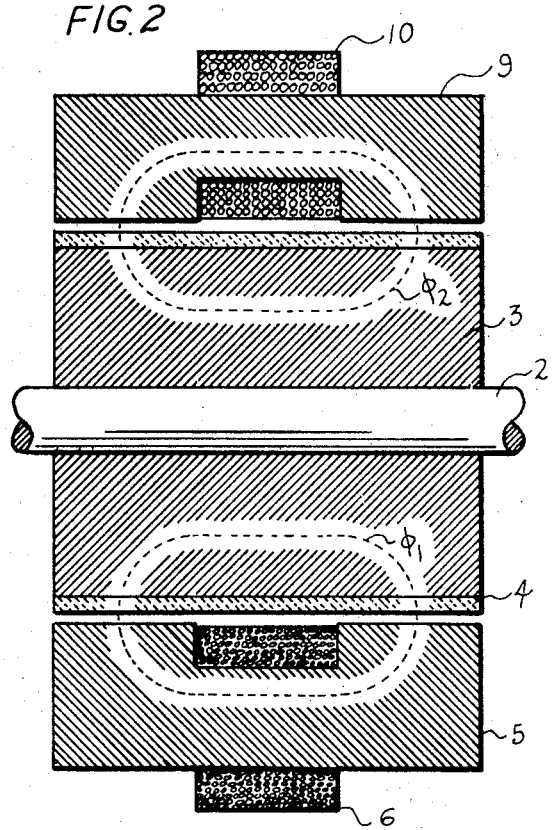
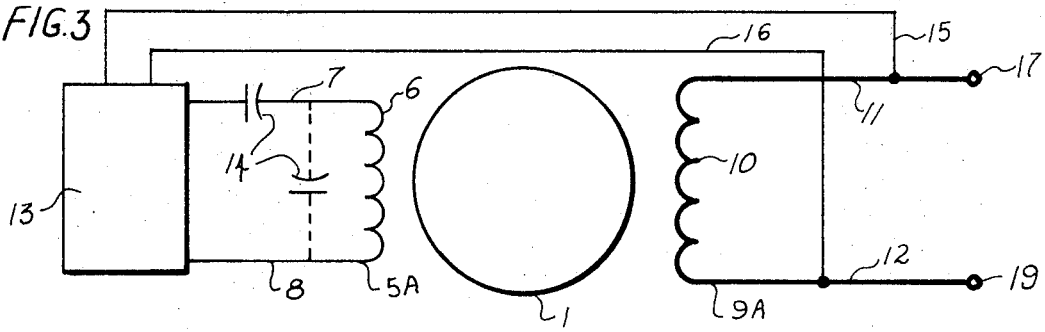
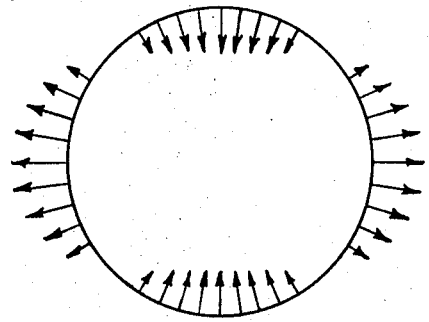
INVENTOR
JOHN F. ROESEL, JR.
BY *Robert Weyer*
   atty.

United States Patent Office 3,521,149
Patented July 21, 1970

3,521,149
ELECTRIC POWER GENERATOR
John F. Roesel, Jr., 8138 Westmoreland Drive,
Sarasota, Fla. 33580
Filed Nov. 16, 1966, Ser. No. 594,764
Int. Cl. H02p 9/42
U.S. Cl. 322—47
16 Claims

ABSTRACT OF THE DISCLOSURE

An electric A.C. generator for producing an output of constant A.C. frequency from a rotational input of varying speed which has a rotor with a layer of magnetizable material on the periphery thereof which when imprinted upon by a magnetic field will become permanently magnetized. Disposed adjacent to this periphery are magnetizing means which create a magnetic field across the travel path of said magnetizable material, with excitation means coupled thereto to create an A.C. excitation of a desired frequency in the magnetizing means so that permanent magnets are endlessly imprinted in said magnetizable material as said periphery passes adjacent said magnetizing means. These permanent magnets are then erased as the permanent magnets again pass before said magnetizing means at which time new permanent magnets are imprinted in the magnetizable material. Angularly disposed about said periphery away from said magnetizing means is a power output means, including coil means with output leads. These coil means are so disposed that electric power is induced therein as the imprinted permanent magnets travel past the coil means.

---

The invention comprehends the generation of electric power by utilizing a field having magnetic memory and imposing on said field a desired pattern of magnetization so as to produce a predetermined output power characteristics.

Other objectives will become apparent upon consideration of the accompanying specification and drawings wherein:

In the drawings:

FIG. 1 shows a diagrammatic end view of one arrangement of the generator according to the invention.

FIG. 2 is a longitudinal section through the form of generator shown in FIG. 1 and taken on line 2—2 of FIG. 1.

FIG. 3 shows a wiring schematic of the generator.

FIG. 4 is a diagrammatic end view of the generator rotor showing one possible magnetic flux pattern.

Referring more particularly to the drawings.

FIG. 1 shows an end view and FIG. 2 shows a longitudinal section of one arrangement of the generator comprising a rotor 1 supported by a shaft 2 connected to a prime mover of any suitable type (not shown). The rotor or rotor structure 1 is composed of a soft magnetic material 3 such as laminated silicon iron or other suitable high permeability ferromagnetic material, suitable for use in an alternating current field surrounded by a layer of magnetic material with a high degree of magnetic memory 4 such as laminated cobalt steel, barium ferrite or other suitable hard ferromagnetic material or structure wherein the magnetic materials are such as to evidence low eddy current losses. In close proximity to the surface of the rotor are two electro magnetic assemblies including an excitation element 5A and a power take-off element 9A.

These elements comprise a high permeability magnetic core 5 composed of laminated silicon iron or other suitable material wound with an excitation coil 6, and a core 9 also of soft magnetic material similar to core 5 wound with a power winding 10. The rotor span of the excitation element core 5 is materially less than the total rotor span of the cores 9 of the power take-off elements as shown in FIG. 1 of the drawings.

FIG. 3 shows an electrical schematic of one arrangement of the generator system wherein excitation winding 6 is shown connected through leads 7 and 8 to excitation current source 13. The power winding 10 is connected by leads 11 and 12 to load terminals 17 and 19. Leads 15 and 16 serve to supply feedback connection from power leads 11 and 12 to excitation current source 13. FIG. 4 is a cross section of the rotor close to one end showing the magnetic field produced when the rotor is revolving at a speed corresponding to four pole synchronous speed, for example 1800 r.p.m. in the case of an output frequency of 60 Hz. The arrows directed toward the center of the rotor denote a south magnetic field and the arrows directed away from the center of the rotor denote a north magnetic field. The flux pattern shown in FIG. 4 represents an end view. The view at the opposite end would be similar but with the phase reversed.

In operation, the rotor is caused to revolve by the prime mover at a speed not significantly less than that corresponding to the synchronous speed indicated by the span of the power core 9. In the case of 60 cycle operation and a power core span of one fourth (¼) of the rotor circumference, this minimum speed would be about 1800 r.p.m. As the rotor is revolving, an excitation current is supplied to the excitation coil 6 via leads 7 and 8. This current is supplied by the excitation source 13 which may be any suitable device for supplying controlled A.C. power such as a solid state ocsillator or a small A.C. generator. A capacitor 14 may be inserted in series with lead 7 or connected in parallel with the coil 6 in order to improve the power factor of the excitation circuit and thereby reduce the necessary volt-ampere capacity of the source 13.

The excitation current supplied to coil 6 will cause a magnetic flux $\phi_1$, to be produced in the magnetic circuit composed of core 5, permanent magnet material 4 and rotor core 3 as shown in FIG. 2. This flux, as it passes through the permanent magnet material 4 will cause that material which is then under the faces of core 5 to become permanently magnetic in a direction and of a magnitude which is a function of the direction and magnitude of the flux $\phi_1$. It will be obvious to those skilled in the art that the pattern of magnetization on the surface of the rotor 1 at any particular speed is therefore a function of the frequency, magnitude and wave shape of the excitation current supplied from the source 13. In the case where the excitation current is alternating at 60 Hz. and the rotor is turning at 1800 r.p.m., a magnetic pattern similar to that shown in FIG. 4 will be produced on the rotor. In this condition, there are four pairs of magnetic poles distributed around the circumference of the rotor arranged so that matching north and south pole sets are oriented axially along the surface of the rotor.

It can be seen that as these pole sets pass under the power core 9 a flux $\phi_2$ as shown in FIG. 2 will be produced which will thread the magnetic circuit composed of the core 9, the permanent magnetic material 4 and the rotor core 3. This flux will cause a voltage to be induced in the power winding 10 which is a function of the rate of change and density of flux $\phi_2$, the cross section area of the face of power core 9, and the number of turns of wire on the winding 10. If the terminals 17 and 18 be then connected to an external load (not shown) a current will flow and the power winding 10 will supply power to such external load. It can be seen that the voltage and frequency of power supplied at terminals 17 and 18 is then a function of the magnetic pattern on the rotor 1 and hence a function of the control current supplied by source 13. Therefore, as the rotor speed is changed, the excitation flux $\phi_1$, will cause a corresponding modification in the pattern of magnetization on the rotor surface such that the output frequency of the power winding 10 will remain essentially constant over a wide range of shaft speed for a constant excitation frequency i.e., the frequency is constant though it undergoes a minor phase shift that will occur under extremely high excitation rates of the rotor speed at commonly used power frequencies.

The leads 15 and 16 serve to supply feed back voltage from the generator output to the control source 13 in order that the control source, by proper design well known to those skilled in the art, may serve to maintain the output voltage of the generator within the desired limits under conditions of changing load, etc.

The number of exciting elements and power elements may be varied, to increase the electric power generated by the generator, or to meet other required conditions of use.

The exciting element and the power generating element are spaced a predetermind distance from each other about the perimeter of the rotor to effect the desired output characteristics not necessarily as shown in FIG. 1.

It will be apparent that the number of poles of the generator may be simply controlled.

In the drawings is shown and in the foregoing is described one form of construction of the generator for the purpose of broad disclosure of the invention and it will be apparent to those skilled in the art that various arrangements and construction of the arts of the generator as shown and described may be made so long as the basic principle of electric power generation disclosed herein is followed and consequently the present application is not to be limited to the specific arrangement and specific construction of parts shown and described, but may be varied within the scope of the claims hereof.

What is claimed is:

1. In an electric generator including a rotor structure comprising a support shaft, a core of high permeability magnetic material carried by said shaft, and a layer of magnetic material carried by said core having a high degree of magnetic memory, one or more exciting elements, and one or more power take-off elements, means for controlling the magnetic field produced by the exciting elements which produces a desired pattern of magnetic polarity and magnitude within the rotor structure, said magnetic pattern resulting in the induction of voltage in the power take-off element or elements to produce electric power of essentially the same frequency as the operating frequency of said exciting element or elements.

2. An electric power generator as claimed in claim 1, including means for feeding back electric current from the power take-off element to the source of excitation power.

3. An electric power generator as claimed in claim 1, wherein said excitation element or elements include cores and said power take-off elements include cores and wherein the total rotor span of the cores of the excitation element or elements is materially less than the total rotor span of the cores of the power take-off element or elements.

4. An electric power generator as claimed in claim 1 wherein the said rotor magnetic materials evidences low eddy current loss.

5. An electric power generator as claimed in claim 1 wherein said rotor magnetic materials is in the form of laminations.

6. An electric power generator as claimed in claim 1 wherein said rotor magnetic material is in the form of electrically non-conductive magnetic material.

7. An electric power generator as claimed in claim 1 wherein said core and layer has essentially continuous uniform magnetic characteristics.

8. An electric generator including a rotor composed of a section of laminated high permeability ferro-magnetic material, and a section of permanent magnetic material an excitation element or elements, a power take-off element or elements, said rotor and said elements so arranged that upon energization of said excitation element or elements and rotation of said rotor, a flux pattern will develop resulting in an electric current at the power take-off element or elements of a substantially constant frequency regardless of the speed of rotation of the rotor, and means for supplying an electric current to said excitation element or elements.

9. An electric power generator as claimed in claim 8, including means for feeding back electric current from the power take-off element to the means for supplying electric current to the exciting element.

10. An electric power generator as claimed in claim 9, including a capacitor connected between the source of excitation electric current and the excitation element.

11. An electric power generator as claimed in claim 9, including a capacitor connected in parallel with the source of excitation current and the excitation element.

12. An electric power generator as claimed in claim 8, wherein the rotor span of the excitation element is materially less than the total rotor span of the cores of the power take-off elements.

13. An electrical generator composed of a rotating field and a stationary armature, means for causing said field to be rotated, said field consisting of a substantially cylindrical core composed of high permeability low loss ferro-magnetic material, a surrounding layer of permanent magnet material around said core, said permanent magnet material in close proximity to and included in the magnetic circuit of the stationary armature, said stationary armature consisting of one or more exciting elements and one or more power take-off elements, said exciting element consisting of a conductive winding about a low loss ferro-magnetic core, an excitation source, said winding connected to said excitation source, said excitation source causing a magnetic flux to be produced in the excitation element core in order to produce a desired pattern of magnetization on the rotating field surface, the power take-off element composed of a conductive winding about a low loss ferro-magnetic core, said power take-off element arranged so that the magnetization pattern on the rotating field will cause a voltage to be induced in the winding of the power take-off element, means for connecting the winding of the power take-off element to an external load in order to supply power to said load, and means for connecting the output of the power take-off element to the excitation source in order to obtain feed back control.

14. An electric A.C. generator for producing an output of constant A.C. frequency from a rotational input of varying speed comprising in combination:
   (a) a rotor member, with a drive shaft and a core of high permeability magnetic material supported by the shaft, whose rotational speed may vary including a defined outer periphery of said rotor member;
   (b) a layer of permanent magnet material on said outer periphery which when imprinted upon by a magnetic field will become permanently magnetized;
   (c) magnetizing means, disposed adjacent said outer periphery to create a magnetic field across the travel path of said permanent magnet material, including excitation means to create an A.C. excitation of a desired frequency in said magnetizing means so that permanent magnets with poles are endlessly imprinted in said permanent magnet material as said periphery passes adjacent said magnetizing means which permanent magnets are then erased therefrom as said permanent magnets again pass before said magnetizing means at which time new permanent magnets are imprinted in the magnetizable material to maintain proper rotor pole spacing in order to achieve constant poles per second past power output means for any speed of the rotor, and (d) power output means angularly disposed about said outer periphery away from said magnetizing means including coil means with output leads therefrom, and said coil means being so disposed that electric power is induced therein as said imprinted permanent magnets travel past said coil means.

15. A generator as claimed in claim 14 said magnetizing means including a coil and a capacitor connected in parallel across said coil and said excitation means.

16. A generator as claimed in claim 14 wherein said magnetizing means and said power output means both span an angle around said outer periphery, the span of said power output means being significantly greater than the span of said magnetizing means.

References Cited

UNITED STATES PATENTS

| | | | |
|---|---|---|---|
| 2,507,936 | 5/1950 | Schroeder | 322—47 |
| 2,522,233 | 9/1950 | Merrill | 310—156 |
| 2,767,339 | 10/1956 | Hatfield | 310—162 |
| 2,831,156 | 4/1958 | Mathews | 322—49 |
| 2,943,257 | 6/1960 | Jacobson | 322—29 |
| 3,230,443 | 1/1966 | Hallidy | 322—28 |
| 2,738,433 | 3/1956 | Schroeder | 310—191 |

ORIS L. RADER, Primary Examiner

A. G. COLLINS, Assistant Examiner

U.S. Cl. X.R.

321—64